May 6, 1969            D. NEIDIG            3,442,422
MERCHANDISE VENDING MACHINE
Filed May 26, 1966            Sheet _1_ of 3
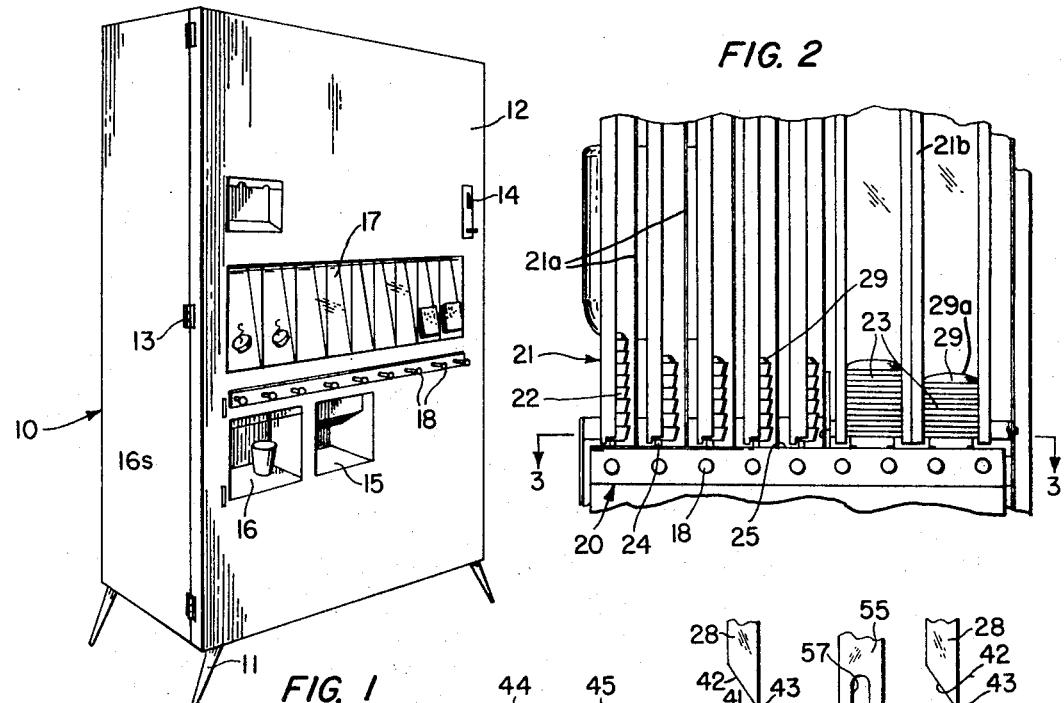
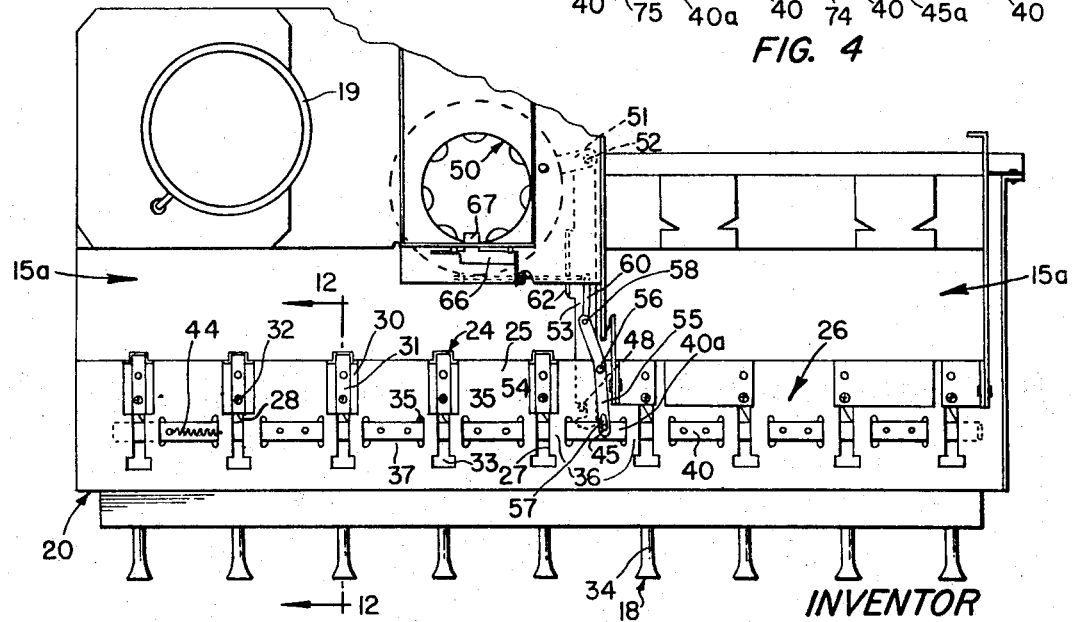
INVENTOR
Dan Neidig
BY Harbaugh & Thomas
Attys

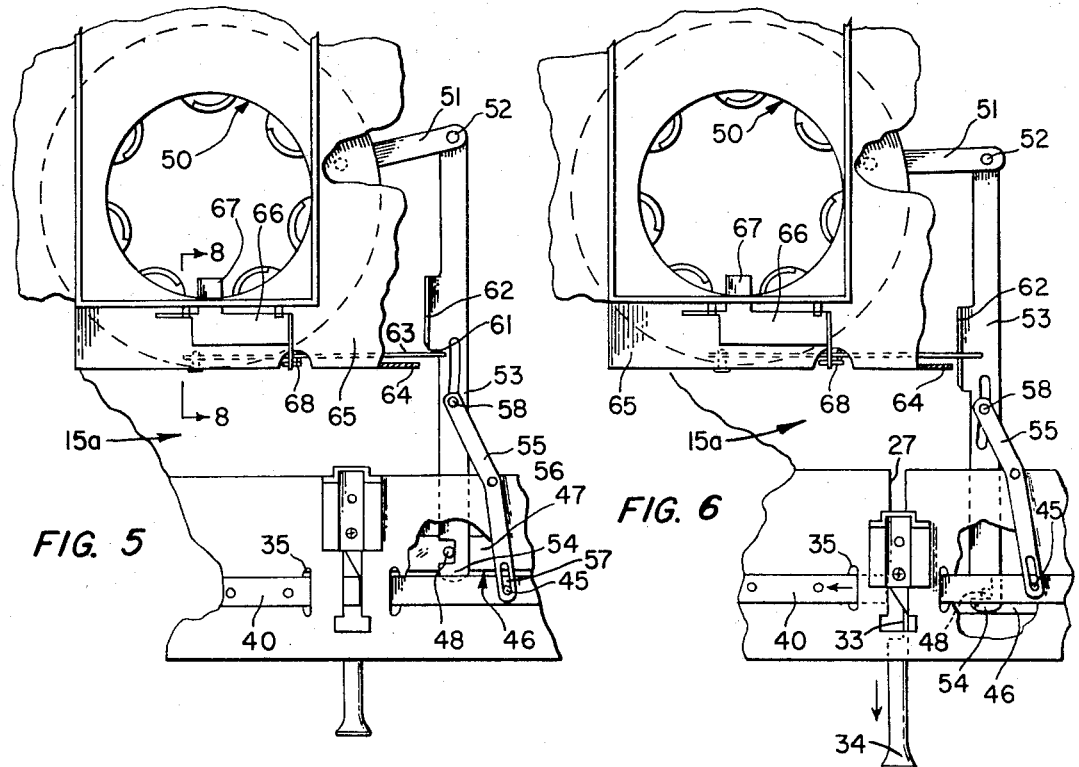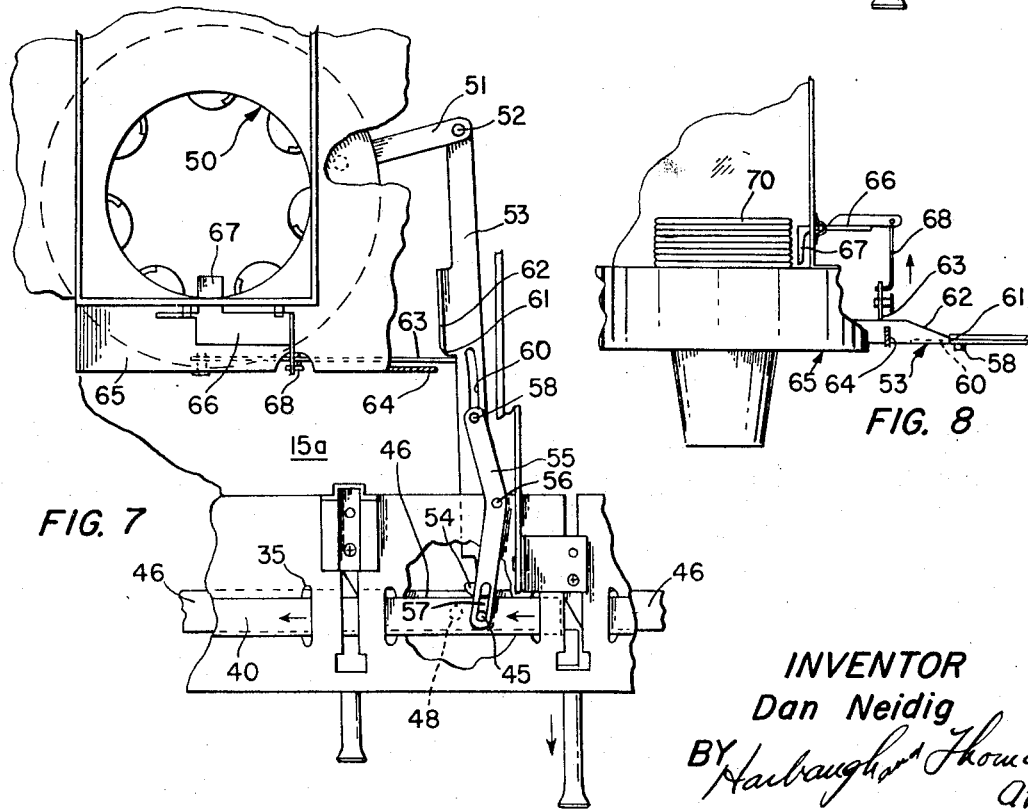

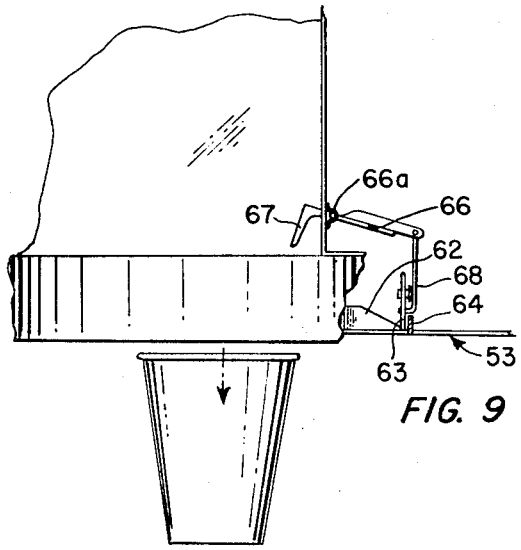
FIG. 9
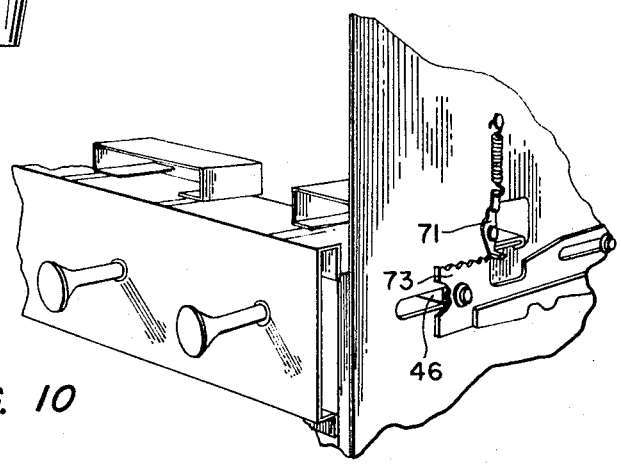
FIG. 10
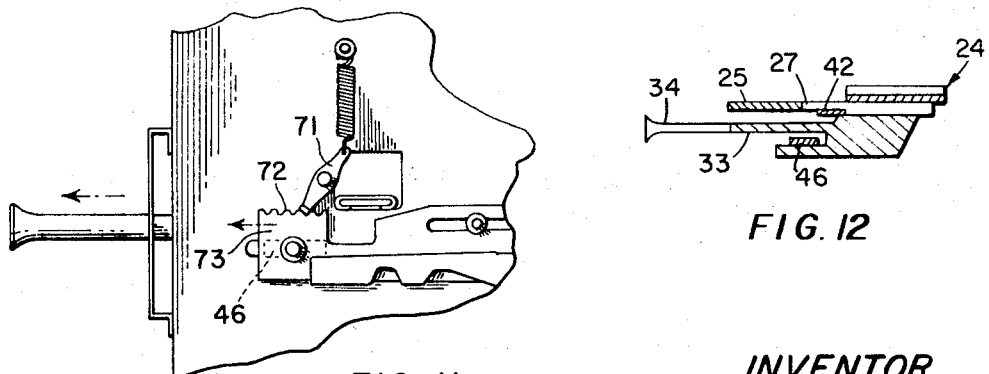
FIG. 11
FIG. 12
INVENTOR
Dan Neidig
BY Harbaugh & Thomas
Attys

United States Patent Office

3,442,422
Patented May 6, 1969

3,442,422
MERCHANDISE VENDING MACHINE
Dan Neidig, Atlanta, Ga., assignor by mesne assignments, to The Vendo Company, Kansas City, Mo., a corporation of Missouri
Filed May 26, 1966, Ser. No. 553,080
Int. Cl. B65h *3/44;* G07f *11/16*
U.S. Cl. 221—94                              7 Claims

ABSTRACT OF THE DISCLOSURE

A vending machine having a plurality of article dispensers and associated actuating mechanisms for operating each of the article dispensers; a cup dispenser and clutch operatively connecting the top dispenser to the actuating mechanisms of the article dispensers, and a disabling mechanism for disengaging the clutch upon actuation of a certain group of article dispensers such that the cup dispenser will not be operated to dispense a cup when any one of the article dispensers of said certain group are actuated.

---

The present invention relates to merchandise vending machines, including coin controlled machines which are selectively actuated manually, and more particularly to the vending of a wide variety of items in different combinations, such as single solid food packages and plural items, including liquid as ingredients for making a beverage.

By way of example and not by way of limitation regarding the merchandise vended, the invention will be described in connection with food and beverage vending operations as a refreshment and snack center.

Food vending machines perform a very useful service in making it possible for persons to purchase a range of merchandise items at all hours of the day at a convenient location. However, where a wide range of different kinds of items, some liquid, some solid, are demanded there has been a segregation of functions between hot liquid drink vendors and vendors of packaged food items in bottles, cans or soft wrappers. The former group require many connections not readily available at most stations.

In the few conventional liquid drink vendors for hot drinks that are placed in service, the purchaser makes a selection of several of a wide number of ingredients and they are dispensed ready-mixed in a cup at a delivery station, all the ingredients having been exposed to air for long periods of storage time in broken wholesale packages, notwithstanding sanitation has been preserved. On the other hand, the great number of package dispensers installed dispense the same item or combination each time a selection is made. The two machines are quite different and for the dispensing of hot drinks and food packages at a given station two specialized machines are provided. For them to be profitable, they must be located only where connection facilities are present and they are convenient to a large group of purchasers. In most of such installations, convenience and ready accessibility are sacrificed where there is great enough business to support the two machines. As a result, thousands of excellent locations lack one or both types of vendors, particularly in small businesses, service stations, offices and the like.

Also increased convenience and better accessibilities at a greater number of stations are available for locating machines vending hot drinks, packaged food and also hot soups and broths from a single and space saving cabinet to replace a multiple machine installation centrally located. The use of such makes it possible to have greater convenience at each station and at least twice the number of stations. At this time, less than 20% of working men and women have a selection of hot drinks available in vending machines irrespective of lack of ready convenience.

In the present invention, it is an object to provide in a single dispensing machine different dispensing characteristics for a variety of different items of purchase including hot beverages and packaged items.

A further object is to provide a single dispensing mechanism controlled by a single coin acceptor unit which dispenses single packages of merchandise with one series of selector actuators and a plurality of objects as separate items by another series of selector actuators.

Another objective of the invention is to dispense all food products stored in fresh sealed dry packages including ingredients for hot drinks and soups along with the latter, provide a cup in which the ingredients are mixed with hot water received from the dispenser whenever desired at the convenience of the purchaser.

The invention is characterized by a series of interlock slide blocks, one of which is interchangeable with any of the others for a desired location in their arrangement whereby dispensing of a second article is prevented when dispensing is actuated by any one of the manually actuated members intended to dispense only one article.

A further object of the invention is to provide in dry form, any or all ingredients desired for a liquid food product and then mix the dry ingredients, both those dispensed and any others added by the purchaser, with hot water at the convenience of the purchaser.

In the present invention it is an object to provide a vending machine which dispenses single packages or the same combinations of items with one series of manually actuated members operating from the same coin control, while with another series of manually actuated members a plurality of items are dispensed, including a clean cup for a potable food mixture. The purchaser thus is provided with the ingredients and can then, or later, make the mixture at his convenience without holding up a line of other purchasers.

A further object is to provide a single coin controlled mechanism dispensing plural items for each purchase with each manual actuation of any single actuator selected from a series of actuators and negate the dispensing of one of the plural items with a single actuator of the remaining actuators.

Another object is to provide an interlock which in one vending machine will prevent ejection of plural article sales when one of the articles is exhausted but will not prevent ejection of single article sales where such articles are in supply.

A further object is to provide a single coin controlled machine which can be adjusted and changed to dispense one or more articles, at any one of a number of stations having independently selectibel actuators operable individually with a single stroke manipulation.

A further object is to provide a coin controlled vending machine for dispensing selectively single and plural sets of articles by single stroke actuation.

Further objects include the provision of an improved coin controlled vending machine of such simple construction and arrangement of parts as to make its manufacture very economical and in combination with the above advantages and objects the incorporatability of a single coin-actuated control mechanism, pawl and ratcher means for a single and full excursion of manual actuation, and an improved ejector interlocking mechanism for precluding more than one ejection at a time.

In the drawings:
FIG. 1 is a front perspective view of a coin controlled vending machine for selective manual actuation embodying the invention;

FIG. 2 is a front elevational view of a portion of the mechanism inside the front door of the cabinet with the package carrying magazines in place;

FIG. 3 is a plan sectional view taken on line 3—3 of FIG. 2;

FIG. 4 is an enlarged fragmentary diagrammatical view of the interlocking elements and their possible arrangement for purposes of the invention;

FIGS. 5, 6 and 7 are plan views of the construction shown in FIG. 4 in three positions of operation;

FIGS. 8 and 9 are side elevations showing the cup drop embodiment in two positions as taken on line 8—8 in FIG. 5;

FIGS. 10 and 11 are perspective and end elevational views respectively showing several positions of the single full excursion control for all manual ejectors; and FIG. 12 is a fragmental cross-sectional view taken generally along lines 12—12 of FIG. 3.

A coin controlled manually actuated vending machine embodying the invention is shown in FIG. 1 having a cabinet 10 supported on legs 11 and a front door 12 hinged at 13. A coin receiving slot 14, package delivery troughs 15, 15a and a hot water receiving station 16 are located in the door along with a partitioned display compartment 17 located above the package ejecting actuators 18 as informative visual guides for selection and appropriate actuation with an outward pull and release. Outward pull cocks the mechanism and the articles selected are ejected and drop into the trough 15a on the back stroke.

Opening the door reveals the chassis 20 and manually operated elements assembled thereon that are controlled by the actuators 18 and the magazine bank 21 supporting stacks 22 and 23 of packages above reciprocal pillow ejectors 24 upon which the lowermost packages rest, vertical baffle 21a prevents articles 22 from toppling out of vertical disposition. When the ejector is pulled outwardly the lowermost package drops to the platform ledge 25 from whence it is ejected as the ejector returns to its original stack-supporting position, thus dispensing a package into trough 15a which leads to trough 15. This is true for all stacks of packages. Followers 29 rest on the top of each stack and when empty, the followers lock the ejectors 24 against actuation by means of a depending flange 29a which falls in front of pillow ejectors 24 to prevent outward movement thereof; it being understood that followers 29 are contained by the article racks 21b against lateral or horizontal movement.

In the plan view of FIG. 3, the magazine bank 21 has been removed showing the plate 26 notched from the rear edge to provide slideways 27 which receive ejector bars 28 slidably therein. The pillow ejectors 24 are yoke-shaped stampings with the planar edge portions 30 disposed uppermost and the bottom 31 central portion secured by screws 32 to the bar 28 to overhang the edges of the slideway and support the bar in the slideway. The screws also secure to the ejector assembly, the rear end of a rod 33 which is provided at its front end with an actuator handle 34.

The plate 26 is slotted in pairs as at 35 on opposite sides of and parallel to each of the slideways 27 with the bridging portions 36 defined thereby serving as an upper guide wall, and with the plate portions 37 slit and offset downwardly by stamping to provide edge walls and bottom guide flanges which guide interlocking elements 40 disposed slidably end to end therein. The interlocking elements are of the same length as the on-center distance between slideways 27 and as seen in FIG. 4 are slightly notched at their corners 41. Also as seen in FIG. 4, the ends of the ejector bars 28 are mitered to provide camming surfaces 42 with the points 43 of the bars receivable between the notches 41 to displace all interlocking elements disposed on the cam side thereof.

The overall length of guides 37 is greater than the collapsed overall length of the interlocking elements by a distance which is substantially the width of one ejector bar 28, which, when driven between any two interlocking elements extends them to the full length of the guide 37. A spring 44 compacts the interlocking elements 40 all in one direction in guides 37 whereby in their resting position all of the points 43 are in register with the notches 41 of the contacting interlocking elements 40. Then, when any bar 28 is actuated, its point 43 will enter the notches 41 in its path and the cam will drive some of the interlocking elements 40 in one direction while the straight side of the bar 28 blocks any movement of the remaining interlocking bars on the other side of it.

This unidirectional movement of some of the interlocking elements 40 is utilized for selective purposes in either dispensing an additional package with certain articles or in not dispensing additional items with certain articles. Although, such a result can be spoken of both ways, there are certain packages which require an additional article, such as dry, instant type coffee and tea mix packages 22 which require a cup for making and consuming them while packages 23 for cookies and candy bars do not require a cup. Accordingly, the unitary items 23 are arranged in one group while the plural item dispensed packages 22 are arranged in another group.

Of the interlocking elements 40 one of them 40a can be considered to be an element common to both package groups 22 and 23, it being shifted by ejector bars of one group and locked against movement by ejector bars of the other group. This element is provided with an upstanding pin 45 movable therewith for use in operating or disabling the actuator of the cup dispenser as will be described.

A conventional coin controlled lock bar 46, such as disclosed in Neidig Patent No. 2,858,001, obstructs forward movement of any of the actuators 18 until released by a coin whereupon the lock bar moves towards the front of the cabinet as a unit upon actuation of any ejector as controlled by gears and racks (not shown) at opposite ends of the bar. For a more complete understanding of the foregoing reference is made to element 44 disclosed in Neidig Patent No. 2,858,001, which corresponds to lock bar 46 herein, and reference to FIG. 10 and column 4, lines 57 to 72 in this Neidig patent is also made in this regard. Lock bar 46 has a follower 47 which includes a pin 48 as the drive member of a reciprocating clutch assembly employed to actuate a cup dispenser 50. When released, lock bar 46 is movable by actuators 18 in generally the same manner disclosed in FIG. 13 of Neidig patent wherein actuator 11 corresponds to actuator 18 herein.

Cup dispenser 50 may include any conventional cup drop mechanism but preferably a cup drop mechanism such as disclosed in Stoner Patent No. 2,925,196; it being understood that the cup drop mechanism forms no part of the present invention. In accordance with one aspect of the present invention cup dispenser 50 is actuated by an arm 51 which pivotally supports as at 52 a reciprocating connecting rod 53 having a hook 54 on its other end engageable with said pin 48. The hook 54 is the driven clutch member so that movement of the lock bar 46 by an actuator 18 operates the cup dispenser when pin 48 is engaged with hook 54. The clutch elements are engaged and disengaged through a class 1 control lever 55 pivotally mounted on the ledge 25 as at 56 with the drive end having a slot 57 therein engaged by the pin 45, and the working end provided with a pin 58 engaging in a slot 60 on the connecting rod 53. The action lever 55 is to engage and disengage clutch elements 48, 54 upon longitudinal movement of the interlocking element 40a in guide 37.

As arranged, lever 55 normally holds clutch elements 48, 54 in engaged relationship and when the interlocking element 40a is moved by the camming action of one of the ejectors 28 as when a package 23 is dispensed, the lever 55 pivots clockwise which pivots connecting rod 53 counterclockwise to disengage the clutch elements so that the cup dispenser is not actuated as the lock bar 46 is moved by an actuator. However, whenever any package 22 is dispensed the interlocking element 40a is held against movement and the clutch is operative to dispense a cup.

At the same time, a cup is dispensed, a serving of hot water is registered in a meter (not shown) and at the convenience of the purchaser after the contents of a package 22 is placed in the cup, along with any other desired ingredients, the cup and contents are placed in the water station 16 as shown in FIG. 1, an actuation switch 16s is depressed and water is supplied from the tank 19, instantly heated and directed with some force into the cup to mix the dry ingredients therein.

In view of the fact that regular customers appreciate that the vendor dispenses cups with some packages and not with others, there is an opportunity for dissatisfaction when a cup, and particularly the last cup, is hung up which occurs quite often with conventional cup dispensers and continues to cycle the vendor without one being dispensed. Accordingly, a cup sensing device is provided which positively engages the lowermost cup or two during off-cycle periods. However, once the dispensing operation has advanced to the point of discharging a cup the sensing contact which generally keeps a cup from dropping is withdrawn, permitting the cup to fall freely when released.

In this connection a stop 61 (FIG. 8) is provided on the connecting rod 53, followed by a cam 62 to coact with a latch 63 which drops between the stop 61 and a block 64 on the cup dispenser support plate 65 whenever the cup dispenser is exhausted. The latch 63 is connected by a wire link 68 to a feeler member 66 pivoted at 66a and having a finger 67 which moves in a direction radial to the cups 70 to engage the beaded edge of the lowermost cup when one is there. If a cup is engaged, the latch is held high enough to clear the stop 61 and be engaged by the cam 62, whereupon the advance of the cam 62 raises the latch further and thereby moves the sensing finger from contact with the cup, freeing it from any possible restraint even if there are additional cups above it. Then when no more cups are present, feeler member 66 pivots downwardly bringing with it the latch 63 which thus engages the stop 61 and the block 64 preventing movement of the rod 53 and its hook 54 which by engaging pin 48 locks bar 46 and prevents dispensing of any packages 22 until cups are replenished.

However, this does not interfere with dispensing packages 23 because lock bar 46 is released by an inserted coin and the movement of interlocking element 40a and lever 55 will disengages hook 54 and pin 48. Thus, the safeguard is locallized for coin return without disturbing other single package purchasers.

Referring to FIG. 3 in connection with FIG. 4, it will be observed that the interlock element 40a having the pin 45 on it can be interchanged with other elements 40 and such an interchange is represented in FIG. 4 where the element 40a is located to the left of its position in FIG. 3. This provides flexibility of products dispensed since it could have been moved to the right. As shown in FIG. 4 the cup will be dispensed with fewer products enabling a change from beverage ingredients to an increase in the number of single package food products dispensed. Moving the element 40a to the right would permit the sale of more drink ingredients with a cup.

When the position of interlocking element 40a is moved to decrease or increase the number of racks of articles which may be dispensed with a cup, (one example of such a repositioning shown in FIG. 4) the position of lever 55 is not changed but instead a connecting bar 74 is employed to connect lever 55 to interlocking element 40a so that movement of interlocking element 40a will be transmitted by bar 74 to lever 55 to disengage the clutch elements 48, 54 so as not to dispense a cup. It will be understood that disengagement of the clutch members 48 and 54 only occurs when interlocking element 40a is moved longitudinally through the camming caused by ejector bars 28. Thus when any interlocking element to the left of interlocking element 40a is cammed by the associated ejector bar 28, interlocking element 40a will not be moved and the clutch will remain engaged to cause dispensing of a cup. Bar 74 has an opening 75 receiving the pin 45 and at its working end a pin 45a which engages in the slot 57 of the lever 55 to actuate the lever for the purposes already described when any actuator 34 to the right of the interlock element 40a is moved.

Referring now to FIGS. 10 and 11 a full stroke guard is shown to assure operation of the device as described herein in that a releasable catch member comprising a pivotally mounted two way pawl 71 engages the teeth 72 of a rack 73 carried by the ends of the coin released bar 46 whenever the bar moves in either direction and prevents reverse movement until movement is complete in each starting direction. This feature is also disclosed in the above identified Neidig Patent No. 2,858,001 in FIG. 7 and column 4, lines 7 to 12 and forms no part of the present invention.

Having thus described the invention and a preferred embodiment of the invention it will be appreciated by those skilled in the art how the objects stated are accomplished and how changes can be made including the action of the clutch for like results with a reversal of parts with respect to their resting and operative position and direction of the action of the ejector cam without departing from the spirit of the invention, the scope of which is commensurate with the appended claims.

What is claimed is:

1. In a multiple article vending machine a plurality of manually operated selective merchandise dispensing actuators having cams thereon, a plurality of interlock elements disposed end to end and movable in a direction transversely to the direction of movement of said actuators, resilient means urging the interlock elements in one direction to dispose the lines of interengaging contacts between the interlocking elements in alignment with said cams, any one of said cams being capable of entering between two of said interlocking elements and moving towards said resilient means all of the interlocking elements as a group which are therebetween and locking the remaining interlocking elements in fixed position, said moved and fixed interlocking elements blocking operation of all remaining actuators, bar means operable by movement of the first to be moved of said actuators, means for actuating a secondary product dispenser associated with dispensed merchandise in connection with certain actuators, clutch means interengaging said bar means and said actuating means for the secondary product dispensing means, and means driven by one of said moved interlocking elements of said group for disengaging said clutch means.

2. In an article dispensing machine the combination comprising; a plurality of primary article dispensers having associated primary actuators for operating the dispensers to dispense a primary article associated therewith, a plurality of interlock elements disposed in end to end relationship, a plurality of cams respectively connected to said actuators to be movable therewith between said interlock elements, means including a spring urging the interlock elements into end to end contact with each other such that movement of a cam between two interlock elements will cause a first group of interlock elements to move longitudinally against the bias of said spring while maintaining the remaining interlock elements locked against movement, a secondary actuator means for actuating a secondary product dispenser associated with certain primary articles to be dispensed and their actuators, means including a disengageable clutch means for operatively interconnecting said secondary actuator means and said primary actuators to move the former for dispensing a secondary product upon movement of certain primary actuators, and means for disengaging said clutch means when certain interlocking elements are moved through a cam to disable the secondary actuator means to prevent dispensing of secondary products in conjunction with certain primary articles dispensed.

3. The combination defined in claim 2 wherein said means for disengaging said clutch means is operatively connected to one of said interlocking elements to be movable thereby to disengage the clutch means when said one interlocking element is moved through the camming action of a cam.

4. The combination defined in claim 3 wherein said means for disengaging said clutch means is a lever having one end pivotally connected with respect to said secondary actuating means and an opposite end pivotally connected with respect to the said one interlocking element.

5. The combination defined in claim 4 further including an operator means connected to the primary actuators to be movable in response to movement of the primary actuators, and wherein said clutch means has one member formed on the secondary actuating means and another member on the operator means.

6. The combination defined in claim 5 wherein said secondary actuating means includes an arm having a slot forming the said one clutch member, the other clutch member is a pin receivable in said slot to establish the clutch connection, said lever has an elongated slot, a pin on one of the interlocking elements being received in said last recited slot, said arm has an elongated slot intermediate the ends thereof, said lever has on its said one end a pin received in the slot in said arm, and said lever is pivoted intermediate its ends with respect to stationary support.

7. In an article dispensing machine including a plurality of primary article dispensers having associated primary actuators for operating the dispensers to dispense the primary articles associated therewith, a plurality of interlock elements disposed in end to end relationship, a plurality of cams respectively connected to said actuators to be movable therewith between said interlock elements, means including a spring urging the interlock elements into end to end contact with each other such that movement of a cam between two interlock elements will cause a first group of interlock elements to move longitudinally against the bias of said spring while maintaining the remaining interlock elements locked against movement, a secondary actuator means for actuating a secondary product dispenser associated with certain primary articles to be dispensed and their actuators, means including a disengageable clutch means for operatively interconnecting said secondary actuator means and said primary actuators to move the former for dispensing a secondary product upon movement of certain primary actuators, and means operatively interconnecting the clutch means and one interlocking element to disengage the clutch means upon movement of said one interlocking element; the steps comprising changing the position of said one interlocking element with respect to the other interlocking elements and then connecting said one interlocking element to the clutch means for disengaging same upon movement of said one interlocking element whereby a different number of primary articles may be dispensed with a secondary product.

References Cited

UNITED STATES PATENTS

| | | | |
|---|---|---|---|
| 1,994,342 | 3/1935 | Fry | 221—125 |
| 2,231,952 | 2/1941 | Rowe et al. | 221—125 |
| 2,365,901 | 12/1944 | Perkins | 221—125 |
| 2,569,486 | 10/1951 | Mills | 221—96 |
| 2,726,026 | 12/1955 | Gould et al. | 221—96 |
| 2,851,189 | 9/1958 | Lux | 221—96 |
| 2,858,001 | 10/1958 | Neidig | 221—125 |
| 2,858,042 | 10/1958 | Gabrielsen et al. | 221—125 |
| 3,010,556 | 11/1961 | Zawrzonek et al. | 221—125 |
| 3,133,671 | 5/1964 | Christine et al. | 221—125 |

WALTER SOBIN, Primary Examiner.

U.S. Cl. X.R.

221—268, 222